J. PIERCE.
INTERNAL COMBUSTION ENGINE.
APPLICATION FILED DEC. 11, 1913.
1,124,512.
Patented Jan. 12, 1915.
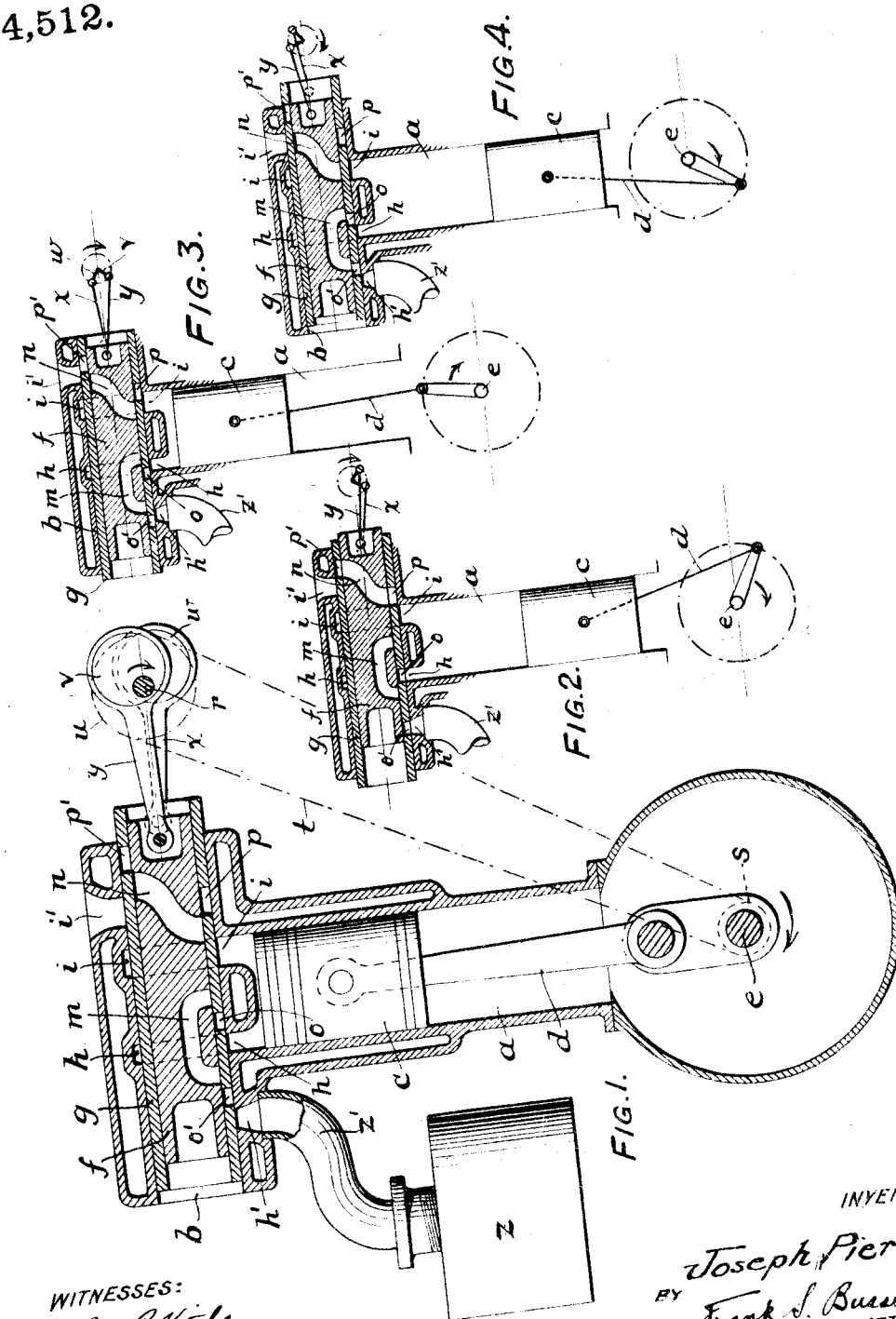
WITNESSES:
INVENTOR
Joseph Pierce
BY Frank S. Busser
ATTORNEY.

UNITED STATES PATENT OFFICE.

JOSEPH PIERCE, OF PHILADELPHIA, PENNSYLVANIA, ASSIGNOR TO THE AMERICAN CYCLE CAR COMPANY, OF PHILADELPHIA, PENNSYLVANIA, A CORPORATION OF DELAWARE.

INTERNAL-COMBUSTION ENGINE.

1,124,512.     Specification of Letters Patent.     Patented Jan. 12, 1915.

Application filed December 11, 1913. Serial No. 805,900.

*To all whom it may concern:*

Be it known that I, JOSEPH PIERCE, a citizen of the United States, residing at Philadelphia, county of Philadelphia, and State of Pennsylvania, have invented a new and useful Improvement in Internal-Combustion Engines, of which the following is a full, clear, and exact description, reference being had to the accompanying drawings, which form a part of this specification.

The object of my invention is to provide a four cycle internal combustion engine of superior efficiency, economy, simplicity and inexpensiveness.

The invention consists of an engine of this type having certain characteristics of structure and operation, chief among which is a new construction and arrangement of valve members and inlet and exhaust ports.

In the drawings: Figure 1 is a vertical sectional view of the engine. Figs. 2, 3 and 4 are diagrammatic views showing the relative positions of piston and valves at different points in the cycle of operations.

While the invention is shown as embodied in a single cylinder, it will be understood that, in practice, and particularly in automobile construction, four or six cylinders will ordinarily be employed, which, however, will involve a mere duplication of those illustrated so connected to the crankshaft as to operate in proper sequence.

The casing of the engine comprises the cylinder or piston chamber $a$ and the valve chamber $b$, the latter being arranged at the head or upper end of the cylinder and at right angles to its axis. Within the cylinder is the reciprocable piston $c$ connected to a crank on the crankshaft $e$ by means of the connecting rod $d$.

The valve chamber $b$ is cylindrical in shape and accommodates the compound reciprocable valve $f$, $g$. This valve is made of two parts: the main valve $f$ having a solid central portion and annular end portions; and the valve sleeve $g$, which concentrically surrounds the main valve and slides between the main valve and the inner wall of the valve chamber.

The head of the cylinder is closed and is provided with separate inlet and exhaust ports, $h$ and $i$. These ports are of annular shape and extend around the valve casing. The valve casing is provided with an exhaust port $i'$ which is located in the side of the valve casing opposite the cylinder and which is offset from the port $i$ in the direction of the length of the valve. The valve casing is also provided with an inlet port $h'$ located in the same side of the valve casing as the cylinder but offset therefrom.

The main valve $f$ is provided with two passages, $m$ and $n$. The passage $n$ extends transversely through the same but at an angle to the radius of the valve. The passage $m$ is a U-shaped passage whose opposite ends extend toward the side of the valve casing at which the cylinder is located.

The valve sleeve $g$ is provided with two pairs of ports, the inlet ports $o$ and $o'$, and the exhaust ports $p$ and $p'$. The ports $p$, $o$ and $o'$ are located in the same side of the valve as the cylinder. The port $p'$ is located in the side of the valve opposite the cylinder.

The carbureter $z$ is connected by means of a pipe $z'$ with the inlet port $h'$ in the valve casing. As will be hereinafter described, the motive fluid enters the piston chamber through the port $h'$, port $o'$, passage $m$, port $o$ and port $h$. The exhaust products of combustion escape from the piston chamber through the port $i$, port $p$, passage $n$, port $p'$ and port $i'$. It will thus be understood that it is necessary for all the ports of a series to communicate in order to admit motive fluid or allow the products of combustion to escape, as the case may be, and that the two series of ports are entirely independent one from the other.

The two members of the valve are given a differential movement from the supplemental shaft $r$, which is driven from the crank shaft $e$, at a ratio of one to two, by any appropriate drive, as, for example, by means of a sprocket chain $t$ engaging a sprocket wheel $s$ fast on the crank shaft $e$ and a sprocket wheel $u$ fast on the valve-actuating shaft $r$. I prefer to actuate the valve members from eccentrics $v$ and $w$, on the shaft $r$. The eccentric $v$ has sleeved on it a connecting-rod $y$ pivotally connected to the main valve $f$; while a connecting rod $x$, pivotally connected to the valve sleeve $g$, is sleeved on the eccentric $w$.

The operation of the valve may be readily understood from the foregoing description in connection with the drawings, the four figures of which illustrate four typical positions of the compound valve in the cycle of the engine.

In Fig. 1 the piston c has reached the upper limit of its stroke and the charge has been compressed, and about in this position the charge is fired. It will be noted that in this position the main valve f and valve sleeve g are in such position as to close both the supply and exhaust and that only the solid part of the valve sleeve is exposed to the fire. As a piston c moves down, the valve members are caused to slide with a differential movement until, when the piston has moved down so that the crank-shaft is about (say) sixty-five degrees from lower dead center, the series of exhaust ports just begin to intercommunicate, as shown in Fig. 2. It will be observed that the ports i and i' are so widely separated as to minimize the possibility of leakage from the port i to the port i'. At the same time the extension of the port entirely around the valve casing maintains the valve balanced by equally distributing the pressure thereon and facilitates the exhaust as soon as the valve moves into position to cause the exhaust ports to intercommunicate.

During the completion of the downward movement of the piston and during its upward movement, the valve members continue to slide, but the exhaust ports remain in communication until the piston has completed its upward stroke and preferably until the crank shaft has passed a very few degrees beyond upper dead center, at which time the exhaust passage n in the main valve is cut off from the exhaust ports p, p', in the valve sleeve, as shown in Fig. 3. Immediately thereafter the inlet ports are brought into position to intercommunicate and remain in this position during the next downward or suction stroke of the piston and until the crank shaft has passed (say) about thirty-five degrees beyond lower dead center, as shown in Fig. 4. While the inlet ports are in communication, a passage of minimum length from the carbureter to the cylinder is provided for the pressure fluid which, both from structural and operative standpoints, is advantageous. When the parts reach the position shown in Fig. 4, the inlet ports o, o', of the valve sleeve are cut off from the cylinder inlet ports h, h; and during the remaining part of the upward or compression stroke of the piston, the positions of the valve members are such as to maintain closed both the supply and exhaust. This completes the cycle of operations.

Having now fully described my invention, what I claim and desire to protect by Letters Patent is:

1. In an internal combustion engine, the combination of a crank shaft, a piston connected therewith, a cylinder having a closed head at one end thereof provided with separate inlet and exhaust ports, a cylindrical valve casing arranged at the head of the cylinder, said ports extending around the inner wall of the valve casing, a valve composed of a sleeve valve slidable within the casing and a main valve slidable within the sleeve, there being an inlet port in the valve casing on the side thereof at which the cylinder is located, an exhaust port in the valve casing on the opposite side thereof, two inlet ports and an exhaust port in the valve sleeve on the side thereof at which the cylinder is located and an exhaust port in the valve sleeve on the opposite side, a U-shaped inlet passage in the main valve adapted to connect the two inlet ports in the valve sleeve, an exhaust passage extending obliquely through the main valve and adapted to connect the two exhaust ports in the valve sleeve, said inlet ports arranged to communicate only with each other and said exhaust ports arranged to communicate only with each other, and means actuated from the crank shaft to impart a differential movement to the valve members.

2. In an internal combustion engine, the combination of a crank shaft, a piston connected therewith, a cylinder, a cylindrical valve casing arranged at the head of the cylinder and provided with two annular ports, one an inlet port and the other an exhaust port, on its inside wall separately communicating with the piston chamber, there being two other ports in the valve casing, one of which is an inlet port on the side thereof at which the cylinder is located and the other of which is an exhaust port, a valve composed of a valve sleeve slidable within the casing and a main valve slidable within the sleeve, there being in the valve sleeve two inlet ports and an exhaust port on the side thereof at which the cylinder is located and also another exhaust port, and in the main valve an inlet passage adapted to connect with the two inlet ports in the valve sleeve and an exhaust passage adapted to connect the two exhaust ports in the valve sleeve, and means actuated from the crank shaft to impart a differential movement to the valve members.

3. In an internal combustion engine, the combination of a crank shaft, a piston connected therewith, a cylinder, a cylindrica valve casing arranged at the head of the cylinder and provided with two annula ports, one an inlet port and the other an exhaust port, on its inside wall separatel communicating with the piston chambei there being two other ports in the valve cas ing one of which is an inlet port and th other an exhaust port, a valve composed c a valve sleeve slidable within the casing an a main valve slidable within the sleev there being an inlet port in the valve sleeve and an inlet passage in the main valve adapted to communicate only with each other and with the other inlet ports, and an exhaust port in the valve sleeve and an exhaust passage in the main valve adapted to communicate only with each other and with the other exhaust ports, and means actuated from the crank shaft to impart a differential movement to the valve members.

4. In an internal combustion engine, the combination of a crank shaft, a piston connected therewith, a cylinder, a cylindrical valve casing having an inlet port on the side thereof at which the cylinder is located but offset relatively thereto and having an exhaust port on the side thereof opposite the cylinder, a valve composed of a valve sleeve slidable within the casing and a main valve slidable within the sleeve, there being two inlet ports and an exhaust port in the valve sleeve on the side thereof at which the cylinder is located and an exhaust port in the valve sleeve on the opposite side, a U-shaped inlet passage in the main valve adapted to connect the two inlet ports in the valve sleeve, an exhaust passage extending through the main valve and adapted to connect the two exhaust ports in the valve sleeve, and means actuated from the crank shaft to impart a differential movement to the valve members.

In testimony of which invention, I have hereunto set my hand, at Philadelphia, on this 21st day of November, 1913.

JOSEPH PIERCE.

Witnesses:
M. M. HAMILTON,
E. E. WALL.